United States Patent
Dahl

[15] 3,696,595
[45] Oct. 10, 1972

[54] LOW-VELOCITY DISCHARGE MEANS FOR ROTARY MOWERS

[72] Inventor: Einar S. Dahl, Galesburg, Ill.

[73] Assignee: Outboard Marine Corporation, Waukegan, Ill.

[22] Filed: July 15, 1970

[21] Appl. No.: 55,144

[52] U.S. Cl. ............56/16.9, 56/17.4, 56/320.2
[51] Int. Cl. ..............................A01d 35/26
[58] Field of Search............56/13.4, 16.9, 17.4, 17.5, 56/202, 320.1, 320.2

[56] References Cited

UNITED STATES PATENTS

| | | | |
|---|---|---|---|
| 2,791,080 | 5/1957 | Shaw | 56/320.2 |
| 3,413,783 | 12/1968 | Gordon | 56/320.2 |
| 2,857,727 | 10/1958 | Cole | 56/320.2 |
| 2,864,226 | 12/1958 | Bright | 56/320.2 |
| 3,499,275 | 3/1970 | Lozen | 56/202 |
| 3,091,906 | 6/1963 | Hall | 56/17.4 X |

Primary Examiner—Louis G. Mancene
Assistant Examiner—J. N. Eskovitz
Attorney—Robert E. Clemency, John W. Michael, Gerrit D. Foster, Bayard H. Michael, Paul R. Puerner, Joseph A. Gemignani, Andrew O. Riteris, Spencer B. Michael and Robert K. Gerling

[57] ABSTRACT

Disclosed herein is a rotary lawn mower including a paddle wheel or fan which is located in the blade housing and freely rotatably supported on the engine output shaft and rotated at a rate of rotation less than the cutting blade. Radially extending paddles move in the path of grass clipping discharge and reduce the velocity of impelled missiles caused by impact with the cutting blade to the low tip velocity of the paddles to minimize danger to bystanders and the mower operator. A horizontal partition located between the cutting blade and the paddle wheel and extending around the blade housing beneath one or more mower grass clipping discharge outlets prevents direct discharge of any missiles through the outlets.

21 Claims, 7 Drawing Figures

PATENTED OCT 10 1972　　3,696,595
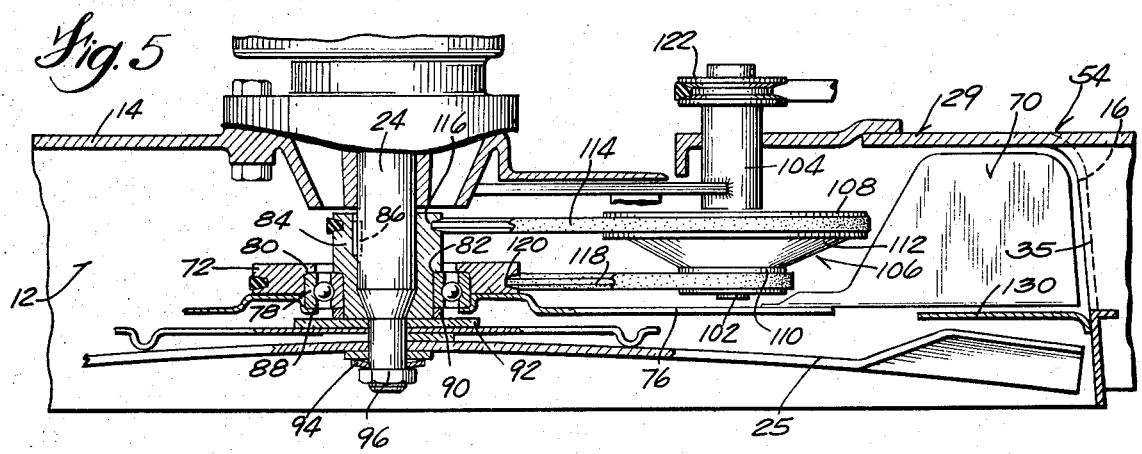
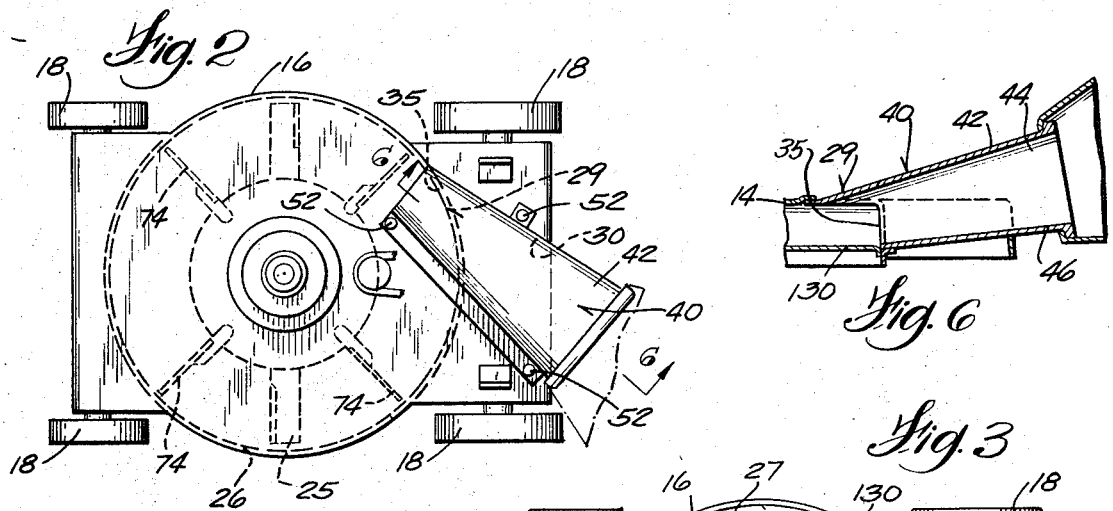
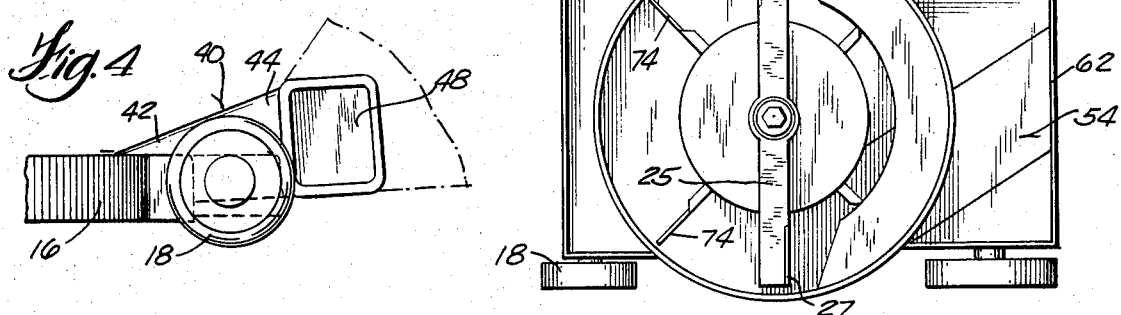
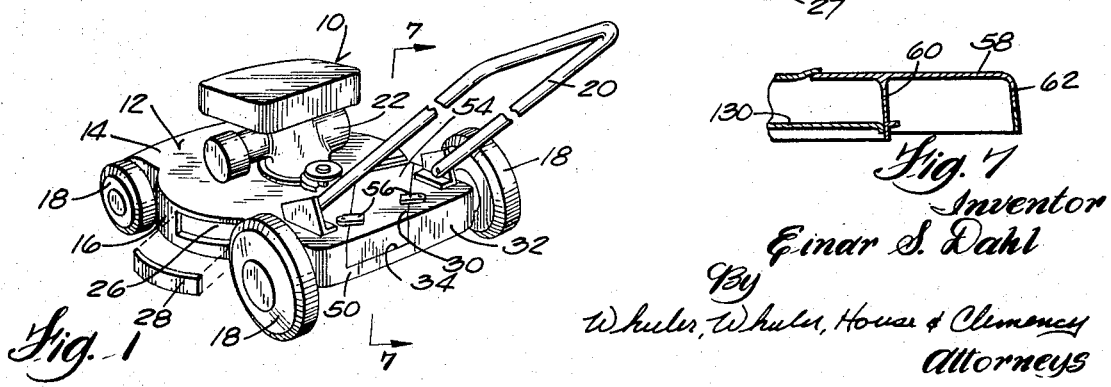
Inventor
Einar S. Dahl
By
Wheeler, Wheeler, House & Clemency
Attorneys

LOW-VELOCITY DISCHARGE MEANS FOR ROTARY MOWERS

BACKGROUND OF THE INVENTION

Present in the operation of conventional rotary lawn mowers are hazards caused by impact of the cutting blade with objects such as stones or pebbles which thus can be impelled at high velocity. Discharge of impelled missiles from beneath the blade housing can be prevented by depending mower side walls and guards at the front and rear of the mower housing. However, missiles still can be ejected from the grass clipping discharge outet. Although the velocity of the grass clippings discharge from a mower may be within safe limits of 3,000 to 4,000 feet per minute, the cutting blade tip velocity in a rotary mower can be approximately 17,500 feet per minute. An object hit squarely by the tip of the cutting blade can be given a velocity close to the velocity of the cutting blade. Escaping objects traveling at such velocity can be dangerous to individuals.

SUMMARY OF THE INVENTION

The invention provides a lawn mower which prevents direct discharge or unimpeded movement of any object impelled by the cutting blade through a mower discharge outlet and insures that the velocity of all material discharged from the outlet, including grass clippings and debris, will be at safe velocities.

In accordance with the invention, the lawn mower is provided with a fan or paddle wheel freely rotatably supported on the engine output shaft for rotation within the blade housing about the axis of the engine output shaft and in a direction common with the direction of rotation of a cutting blade which is fixedly secured to the engine output shaft. To reduce the velocity of discharge debris, the paddle wheel is driven by the engine at a rate of rotation less than the rate of rotation of the cutting blade.

The invention also provides a horizontal partition or separator which is secured to the inside of the mower housing and located between the paddle wheel and the cutting blade. The separator is located beneath and extends in advance of one or more mower discharge outlets so that no line or trajectory in a vertical plane and tangent to the path of blade rotation can extend through a mower discharge outlet. Thus, the separator prevents free, unimpeded movement of missiles through the discharge outlet and the paddles on the paddle wheel insure that the velocity of the missiles will be no greater than the safe, low tip velocity of the paddles.

Also in accordance with the invention there is provided a chute which is connectable to a top discharge opening in a blade housing and which communicates interiorly with the blade housing above the partition. In addition, in the disclosed construction, the chute extends generally rearwardly to provide a rearward discharge outlet.

One of the principal objects of the invention is the provision of an improved rotary lawn mower including deflector means located within the blade housing for preventing rectilinear travel through a discharge outlet or opening of objects struck by the cutter blade.

Another of the principal objects of the invention is the provision of a rotary lawn mower including a paddle wheel which is located in the path of travel to a discharge outlet of objects struck by the cutting blade and which functions to assist in preventing direct or rectilinear travel through a discharge outlet of objects struck by the cutter blade.

Another of the principal objects of the invention is the provision of a paddle wheel such as is referred to in the prior paragraph and which rotates in the same direction as the cutting blade but at a considerably slower speed.

Another of the principal objects of the invention is the provision of a rotary lawn mower including a deflector ring segment extending generally horizontally and above the rotary path of the cutting blade and below a discharge opening and located relative to such discharge opening to prevent direct or rectilinear discharge through such discharge opening of missiles impelled by the cutting blade.

Still another object of the invention is the provision of a rotary lawn mower having a top discharge opening communicating with the interior of the blade housing in the area above a deflector ring segment, and a chute connectable with the opening to provide for rearward discharge of clippings.

Still another object of the invention is the provision of a chute such as is referred to in the preceding paragraph including a bottom wall or panel, as well as side and top panels.

Other objects and advantages of the invention will become known by reference to the following description and claims and the accompanying drawings.

DRAWINGS

FIG. 1 is a perspective view of a lawn mower embodying the invention.

FIG. 2 is a plan view of a lawn mower as shown in FIG. 1 and including a discharge chute.

FIG. 3 is a bottom view of the lawn mower shown in FIG. 2.

FIG. 4 is a fragmentary side elevational view of the lawn mower shown in FIG. 2.

FIG. 5 is an enlarged fragmentary sectional view of the lawn mower shown in FIG. 1.

FIG. 6 is a fragmentary sectional view taken generally along line 6—6 of FIG. 2.

FIG. 7 is a fragmentary sectional view taken along line 7—7 of FIG. 1.

GENERAL DESCRIPTION

In the drawings, FIG. 1 shows a lawn mower 10 and which includes a mower housing 12 provided with a top deck 14 and a vertical wall 16 (See FIGS. 1 and 3) depending from the deck 14 and extending continuously in an annular form except as otherwise noted herein. The mower is supported for travel along the ground by wheels 18 and includes a handle 20 for guiding mower movement. An engine 22 is supported on the deck 12 and has an output shaft 24 (FIG. 5) with a cutting blade 25 having cutting edges 27 at the outer ends thereof. The vertical wall 16 is provided at the left side (in relation to the direction of intended advance) and at about 9 o'clock, with an arcuate slot or opening (See FIG. 1) which forms a grass clipping discharge side outlet 26. It is especially noted that the discharge slot or opening 26 terminates above the bottom of the peripheral wall 16 for purposes which will be described in greater detail hereinafter. In other words, the peripheral wall 16 is continuous below the outlet 26. When the side outlet 26 is not in use, it is closed by a detachable cover or panel 28. If desired, the side outlet 26 can be provided with means for attaching a collection bag for grass clippings.

The mower 10 also includes a second or top outlet 29 provided, in part, by formation of the deck 14 at about 5 to 6 o'clock with a slot 30 (FIGS. 1 and 3) which extends inwardly from a rearwardly located depending wall 32 to within the area bounded by the depending vertical wall 16. Aligned with the slot 30 and communicating therewith is a slot or opening 34 which is located in the rearward wall 32 depending from the top deck 14 and which can either extend all the way to the bottom of the rearward wall or terminate, as shown, above the bottom of the rearward wall to provide a support for a chute still to be described. Also associated with the slot 30 and communicating therewith is still another slot 35 which is located in the annular wall 16 and which extends to a level below the top deck approximately the same as the lower edge of the slot 26.

When it is desired to collect the grass clipping in a collection bag, a removable discharge chute 40 (FIGS. 2 and 4) is employed in associated with the top outlet 29 provided by the slots 30, 34, and 35. The chute 40 is of tubular construction including a top panel 42, opposed side panels 44 and a bottom panel 46, which define a mouth at the front of the chute and which terminate rearwardly to provide an outlet 48 to which a grass collection bag can be attached.

The top panel 42 extends rearwardly from the forward margin of the slot 30 while the side panels extend upwardly and rearwardly from along the side edge of the slot 30 from the forward end thereof to the slot 35 in the annular wall. The side panels 44 then also extend downwardly and rearwardly from along the vertical margins of the slot 35. The bottom panel 46 extends rearwardly from the lower margin of the slot 35 in the annular wall 16 and between the bottom margins of the side panels 44. When the rearward slot 34 is terminated above the bottom of the wall 32, as shown, the resulting lower edge 50 can be used to support the bottom panel 46 of the chute 40. Fasteners 52 (See FIG. 2) connected to the side panels 44 can be employed to detachably connect the chute 40 to the housing 12.

Accordingly, the area in the housing inwardly of the annular wall 16 can be placed in communication with the interior of the chute 40 through the top outlet 29 provided by the slot 35 and the portion of the slot 30 inwardly of the annular wall 16.

When it is desired to discharge grass clippings through the side discharge outlet 26, the slots 30, 34, and 35 are covered by a removable or detachable panel 54 (FIG. 1) which is anchored by tabs 56 and which includes a horizontal portion 58 adapted to close the slot 30 and depending portions 60 and 62 respectively adapted to close the slots 34 and 35.

In accordance with the invention, the lawn mower 10 also includes a fan or paddle wheel 70 (FIG. 5) comprising a hub 72 and a plurality of radially extending fan blades or paddles 74 (four in the disclosed construction) connected to the hub by radial arms 76. Means are provided for rotatably supporting the paddle wheel 70 on the output shaft 24. While various arrangements can be employed, in the disclosed construction, such means includes the hub 72 and a bearing 78 interfitted between a shoulder 80 on the hub 72 and a shoulder 82 on a bushing 84 which is keyed to the output shaft 24 by a key 86. The bearing 78 is retained against axial displacement in the direction opposite from the shoulder 80 on the hub 72 by projections 88 on the arms 76. In addition, the bearing 78 is retained against axial movement relative to the bushing 84 in the direction away from the shoulder 82 by a washer 90 located between the bearing 78 and a ring member 92 held in place by a spring washer 94 and a bolt 96 at the bottom of the output shaft 24.

Means are provided for rotating the paddle wheel 70 in a direction common with the cutting blade 24 and at a lower rate of rotation than the engine output shaft 24. While various arrangements can be employed, in the disclosed construction, such means comprises an intermediate shaft 102 rotatably supported in a hollow base or bearing 104 which is supported by the mower housing 12. A double pulley member 106 is fixedly secured to the shaft 102 and has a large diameter pulley 108 and a small diameter pulley 110 connected by an intervening part 112. The large diameter pulley 108 is connected to the engine output shaft 24 by a belt 114 which is reeved around a groove 116 in the bushing 84. The smaller pulley 110 is connected to the paddle wheel 70 by a belt 118 which is received around the smaller pulley 110 and in an annular groove 120 in the hub 72. Another pulley 122 carried on the shaft 102 can be used to drive at least some of the mower wheels 18.

With the engine operating at a rate of rotation of 3100 revolutions per minute, the cutting blade tip velocity can be in the vicinity of 17,500 feet per minute. A missile impelled at this velocity can cause serious injury. By contrast, because of the pulley system just described, the tip velocity of the paddles 74 is less than 4,000 feet per minute and within a safe velocity range.

To insure that all objects discharged through the side and top mower outlet 26 and 29 are traveling at no greater velocity than the tip velocity of the paddles, the invention also includes a partition or deflector plate or separator 130 which is in the shape of a ring segment and which is fixedly connected to the depending wall 16 and which is located below the bottom edges of the side discharge outlet 26 and the slot 35 so as to preclude direct or straight line access from the cutting edges 27 of the cutting blade 25 to the side discharge outlet 26 and the slot 35. In this regard, the separator 130 is desirably arranged so that it extends radially inwardly beyond the cutting edges 26 of the cutting blade 25 and relative to the grass clipping discharge side opening 26 so that the separator or deflector 130 extends from the vertical edge of the side outlet 26 located in the direction of rotation of the blade 25 and so that the separator or deflector 130 extends a substantial distance in the direction counter to the direction of blade rotation from the discharge side outlet 26. Thus in the specifically illustrated construction, the separator or deflector 130 extends from about 3 o'clock to about 9 o'clock as viewed in FIG. 2. More specifically, as disclosed, the separator or deflector 130 extends for approximately 160° in advance of the side opening 26 with respect to the direction of blade rotation, thereby preventing any object impelled by the cutting blade from being thrown in a straight line directly out through the side outlet 26. The location and dimensions of the separator or deflector 130 are also such that no line in a vertical plane tangent to the path of cutting blade rotation can extend into the discharge side outlet 26 or the slots 30 and 35.

Various of the features of the invention are set forth in the following claims.

What is claimed is:

1. A lawn mower including a blade housing having a depending annular wall with a discharge opening, an engine supported on said housing and including an engine output shaft having thereon a cutting blade, a paddle wheel, means for rotatably supporting said paddle wheel above said cutting blade and within said annular wall for rotation about the axis of rotation of said output shaft, and means for driving said paddle wheel at a rate of rotation less than said cutting blade.

2. A lawn mower in accordance with claim 1 wherein said paddle wheel includes a hub and said means for rotatably supporting said paddle wheel comprises a bearing located between said hub and said output shaft.

3. A lawn mower in accordance with claim 1 wherein said paddle wheel has a hub and a series of angularly spaced blades extending from said hub.

4. A lawn mower in accordance with claim 1 wherein said means for driving said paddle wheel at a rate of rotation less than said cutting blade comprises first and second pulleys supported for common rotative movement on said housing independently of said output shaft and said paddle wheel and with said second pulley having a diameter less than said first pulley, means drivingly connecting said output shaft to said first pulley, and means drivingly connecting said second pulley and said paddle wheel.

5. A lawn mower in accordance with claim 1 including a partition located within said annular wall and extending between the paths of rotation of said cutting blade and said paddle wheel.

6. A lawn mower in accordance with claim 5 wherein said partition extends from the end of said discharge opening in the direction of blade rotation and in the direction counter to the direction of blade rotation for a distance which blocks a trajectory in a vertical plane tangent to the rotational path of said blade.

7. A lawn mower in accordance with claim 5 wherein said partition is concentric with said annular wall and has an arcuate extent of more than about 160°.

8. A lawn mower in accordance with claim 5 wherein said cutting blade includes at one end thereof, a cutting edge, and wherein said partition extends radially inwardly from said annular wall for a distance greater than the radial length of said cutting edge.

9. A lawn mower in accordance with claim 5 wherein said discharge opening is located at about 9 o'clock and said partition extends from about 3 o'clock to about 9 o'clock.

10. A lawn mower including a blade housing with an annular wall, an engine supported on said housing and having an output shaft carrying a cutting blade, a deflector plate extending from said housing inwardly from said annular wall above the rotational path of said cutting blade and inwardly beyond the periphery of the rotational path of said cutting blade, and a discharge opening in said annular wall located wholly above said deflector plate.

11. A lawn mower in accordance with claim 10 wherein said cutter blade includes at one end thereof a cutting edge and wherein said partition extends radially inwardly from said annular wall a distance greater than the radial length of said cutting edge.

12. A lawn mower in accordance with claim 10 wherein said discharge opening is located at about 9 o'clock and said partition extends from about 3 o'clock to about 9 o'clock.

13. A lawn mower including a housing having a deck and an annular wall depending from said deck, a discharge outlet in said housing, wheels for supporting said housing for travel above the ground, an engine supported on said housing and having an output shaft carrying a cutting blade, a paddle wheel having angularly spaced paddles, means for rotatably supporting said paddle wheel in concentric relation to the axis of said output shaft with said paddles located between said deck and said cutting blade, means for rotating said paddle wheel with a paddle tip velocity less than the cutting blade tip velocity, and a partition extending radially inwardly from said annular wall between said paddle wheel and said cutting blade and beneath said discharge outlet.

14. An lawn mower including a blade housing having a deck and a depending annular wall, a shaft carrying a cutting blade rotatable in a path located beneath said deck, a slot extending inwardly from said annular wall and having inwardly extending margins, an opening in said annular wall extending downwardly from said slot in said deck and having downwardly extending margins, said slot and said opening forming a discharge outlet, and a discharge chute detachably connectable to said blade housing in registry with said discharge outlet to receive grass clippings and debris from within said housing, said chute having a mouth with portions in registry with said inwardly extending margins of said slot in said deck and with portions in registry with said downwardly extending margins of said opening in said annular wall.

15. A lawn mower in accordance with claim 14 including a panel having an upper wall portion and a depending wall portion, and means for detachably connecting said panel to said mower housing with said upper wall portion in closing relation to said slot and said depending wall portion in closing relation to said opening to close said discharge outlet.

16. A lawn mower in accordance with claim 14 including a partition extending radially inwardly from said annular wall below said discharge outlet and above the path of said cutting blade.

17. A lawn mower in accordance with claim 16 wherein said cutting blade includes at one end thereof, a cutting edge, and wherein said partition extends radially inwardly from said annular wall for a distance greater than the radial length of said cutting edge.

18. A lawn mower in accordance with claim 16 wherein said partition extends from about 3 o'clock to about 9 o'clock.

19. A lawn mower in accordance with claim 16 and further including a paddle wheel rotatably mounted in said housing co-axial with said cutting blade and between said deck and said deflector plate and means connected between said output shaft and said paddle wheel for rotating said paddle wheel at a slower rate than said output shaft.

20. A lawn mower in accordance with claim 19 wherein said discharge outlet is located at about 5 to 6 o'clock.

21. A lawn mower in accordance with claim 14 wherein said chute includes a top panel, side panels and a bottom panel.

* * * * *